United States Patent [19]
Beck et al.

[11] Patent Number: 5,714,111
[45] Date of Patent: *Feb. 3, 1998

[54] ONE PIECE SELF-STANDING BLOW MOLDED PLASTIC CONTAINERS MADE FROM A MONOBASE PREFORM

[75] Inventors: Martin H. Beck; George F. Rollend, both of Amherst; John H. Muszynski, Auburn; Lydia K. Reed, Amherst; Scott J. Hickey, Hollis; Robert J. Caldicott, Nashua; Dennis C. Connor, Merrimack, all of N.H.

[73] Assignee: DTL Monofoot Limited Partnership, Amherst, N.H.

[*] Notice: The term of this patent shall not extend beyond the expiration date of Pat. No. 5,614,148.

[21] Appl. No.: 599,515

[22] Filed: Jan. 26, 1996

Related U.S. Application Data

[63] Continuation-in-part of Ser. No. 380,647, Jan. 30, 1995, Pat. No. 5,614,148.
[51] Int. Cl.$^6$ .................. B29C 49/12; B29D 22/00
[52] U.S. Cl. .................. 264/532; 215/375; 428/36.92; 428/542.8
[58] Field of Search .................. 264/523, 532, 264/537; 215/375; 428/36.92, 542.8

[56] References Cited

U.S. PATENT DOCUMENTS

| | | | |
|---|---|---|---|
| 4,403,706 | 9/1983 | Mahajan | 428/542.8 |
| 4,525,401 | 6/1985 | Pocock et al. | 428/39.92 |
| 4,785,948 | 11/1988 | Strassheimer | 428/542.8 |
| 4,880,593 | 11/1989 | Strassheimer | 264/532 |
| 4,892,205 | 1/1990 | Powers et al. | 428/542.8 |
| 4,927,679 | 5/1990 | Beck | 264/532 |
| 5,104,706 | 4/1992 | Krishnakumar et al. | 428/542.8 |
| 5,116,565 | 5/1992 | Yoshino | 264/532 |
| 5,160,059 | 11/1992 | Collette et al. | 264/523 |
| 5,614,148 | 3/1997 | Beck et al. | 264/532 |

*Primary Examiner*—Catherine Timm
*Attorney, Agent, or Firm*—Davis And Bujold

[57] ABSTRACT

The invention provides a light weight self-standing blow molded two liter carbonated beverage bottle having a unique petaloid base made from a monobase preform. The base comprises a petaloid design which has a plurality of at least three (preferably five) feet. The monobase preform has a thick reinforcing ring forming portion which remains relatively unstretched during blowing. The reinforcing ring forming portion is thicker than both the strap forming portion, sloping outer wall forming portion and the gate area forming portion of the preform thereby resulting in increased wall thickness reduction, stretching and orientation in those areas during blowing. The reinforcing ring extends circumferentially around the base. By providing such a reinforcing ring, a bottle having a bigger foot radius and/or containing less material usage than prior art containers can be realized. The resulting bottle has less stress whitening and greater stress crack resistance while at the same time using less material and/or having a larger radius than prior bottles.

18 Claims, 6 Drawing Sheets

ONE PIECE SELF-STANDING BLOW MOLDED PLASTIC CONTAINERS MADE FROM A MONOBASE PREFORM

This is a continuation-in-part of U.S. patent application Ser. No. 08/380,647, filed on Jan. 30, 1995 now U.S. Pat. No. 5,614,148.

The present invention relates to plastic containers for containing fluids under pressure and the methods of producing same and, more particularly, to a one-piece disposable plastic bottle of the petaloid base variety having a reinforcing ring and a stretched gate area. The monobase preform has a reinforcing ring forming portion. The reinforcing ring forming portion is thicker than at least the sidewall forming portion and also, usually, the gate area forming portion. The reinforcing ring extends circumferentially around the base. By providing such a reinforcing ring, a bottle base having a bigger foot radius and/or using less material can be realized. The resulting bottle has less stress whitening in the foot area and greater stress crack resistance.

BACKGROUND OF THE INVENTION

Blow molded plastic bottles have largely replaced the heavier glass bottles previously used for soft drinks, and the like. In a two liter bottle of plastic, the weight of the bottle itself is negligible as compared to the weight of a glass bottle of similar capacity. The first plastic bottles were generally two piece bottles comprising a pressure vessel portion and base which permitted the bottle to stand upright on shelves, and the like. The pressure vessel portion was typically of a tough, flexible plastic (e.g. polyester) which became resiliently rigid for gripping due to the internal pressure created by the carbon dioxide gas in the soft drink liquid contained therein. The bottom was hemispherical and the separate base was required in order for the bottle be able to stand by itself. The base was typically of a plastic such as polyethylene and is attached over the bottom of the pressure vessel portion with adhesive.

One alternative to a two-piece construction is to create a bottle having a so-called "champagne" base which resists the internal pressure. Rollout or inversion of the base is a problem in such designs. Rollout is a structural failure of the base of the bottle upon internal pressurization. The internal pressure causes the central portion of the base to creep downwardly, rolling or pivoting about the chime (which corresponds to the foot pads and adjoining strap areas of a petaloid bottle). If the central portion of the base creeps downward past the annular foot, the champagne base becomes inverted and the bottle will tip over.

In an attempt to avoid rollout, numerous bottle configurations have been proposed incorporating, for example, integral pressure-resistant ribs into the bottom of the bottle. Other prior art approaches are those disclosed in the inventor's own U.S. Pat. Nos. 4,780,257; 4,889,752; 4,927,679 which relate to a container having an annular peripheral chime surrounding an inward sloping base portion for resisting inversion of the base, caused by internal pressure, comprising an integral reinforcing ring incorporated into the base and running horizontally in the hoop direction. This reinforcing ring is placed in a location within the base to oppose inversion of the base.

More recently, bottle designs utilizing a petaloid base have been proposed. Petaloid bases likewise suffer from the problem of rollout. Moreover, the complex geometry of petaloid bases complicates efforts to reinforce the base and prevent rollout.

In all polyester (usually PET) bottles, weight is a very important consideration. Based on a conservative estimate of 5 billion bottles produced per year and a PET price of $(US) 1.54 per Kg ($(US) 0.70 per pound), a 1–2 gram decrease in the PET content of a bottle will save approximately $(US) 7–14 million per year. Therefore, simply thickening the entire base of a petaloid based bottle to prevent rollout is undesirable.

OBJECT OF THE INVENTION

It is an object of the present invention to provide a construction for the base of a one piece plastic bottle for containing carbonated beverages which is of the petaloid type providing a larger support radius and/or using less material than prior art designs.

It is a further object of the present invention to provide a method for the blow molding of a light-weight one piece plastic bottle for containing carbonated beverages from a preform having a thickened annular region at the transition between its sidewall forming portion and its closed end.

SUMMARY OF THE INVENTION

According to the invention there is provided a blow molding process for producing a self-standing one-piece polyester container for carbonated beverages defining a longitudinal axis and comprising a sidewall portion which is integral with and terminates in a closed base portion of a petaloid form defining at least three feet disposed about the longitudinal axis whereby the container is self standing, each said foot being defined by: i) a support pad; ii) a sloping outer wall extending generally upwardly from a radially outward extremity of the support pad to the sidewall portion; iii) sloping lateral walls extending generally upwardly from radially extending extremities of the support pad to radially extending straps disposed between adjacent pairs of feet, each said strap extending from a gate area, centered on said longitudinal axis, along a curve to said sidewall portion; iv) a sloping inner wall extending from a radially inner extremity of the support pad to the gate area; and, v) a reinforcing ring located on said curve between said gate area and said sidewall portion, in a transition between said support pad and said sloping outer wall and in at least a portion of said sloping outer wall adjacent this transition, and extending circumferentially around said base portion through said pads, said lateral sloping walls and said straps, the method comprising the steps of: a) forming a hollow preform comprising a sidewall forming portion of constant wall thickness along the length of the sidewall forming portion, for forming a constant thickness sidewall portion of the container, and terminating, in a closed base forming portion, a reinforcing ring forming portion being located at a transition between the sidewall forming portion and the base forming portion, said reinforcing ring forming portion having a wall thickness greater than the wall thickness in the sidewall forming portion and greater than a wall thickness in the base forming portion, the wall thickness in the base forming portion being equal to or less than the wall thickness in the sidewall forming portion; b) temperature conditioning the preform; c) positioning the preform in a blow mold cavity defining the finished container shape and having a neck finish engaging top and a base forming bottom; d) inserting a stretch rod into the preform; e) extending the stretch rod within the cavity to move the bottom of the preform toward the bottom of the blow mold cavity to longitudinally stretch the material in at least the sidewall forming portion such that the preform extends from the top to adjacent the bottom of the blow mold cavity; and, f) injecting pressurized gas into the preform whereby the preform is radially stretched outwardly to fill the blow mold cavity to form the container with the material of the reinforcing ring located in the transitions between said support pads and said sloping outer walls and in at least a portion of said sloping outer walls adjacent these transitions, extending circumferentially around said base portion through said pads, said sloping lateral walls and said straps, and not extending radially inwardly to transitions between the sloping inner walls and the gate area, and the gate area and the transitions between the sloping inner walls and the gate area both having wall thicknesses that are less than the wall thicknesses in corresponding portions of a preform from which the container is blown.

According to the invention there is also provided a self-standing polyester container for carbonated beverages defining a longitudinal axis and comprising a sidewall portion which is integral with and terminates in a closed base portion of a petaloid form defining at least three feet disposed about the longitudinal axis whereby the container is self standing, each said foot being defined by: i) a support pad; ii) a sloping outer wall extending generally upwardly from a radially outward extremity of the support pad to the sidewall portion; iii) sloping lateral walls extending generally upwardly from radially extending extremities of the support pad to radially extending straps disposed between adjacent pairs of feet, each said strap extending from a gate area, centered on said longitudinal axis, along a curve to said sidewall portion; iv) a sloping inner wall extending from a radially inner extremity of the support pad to the gate area; and, v) a reinforcing ring located on said curve between said gate area and said sidewall portion, in a transition between said support pad and said sloping outer wall and in at least a portion of said sloping outer walls adjacent these transitions, and extending circumferentially around said base portion through said pads, said lateral sloping walls and said straps, and not extending radially inwardly to transitions between the sloping inner walls and the gate area, and the gate area and the transitions between the sloping inner walls and the gate area both having wall thicknesses that are less than the wall thicknesses in corresponding portions of the preform.

BRIEF DESCRIPTION OF THE DRAWINGS

The invention will now be described, by way of example, with reference to the accompanying drawings, in which.

DETAILED DESCRIPTION OF THE INVENTION

Briefly, the base of the preferred form of the container of the present invention comprises a petaloid design for a bottle which has a plurality of at least three (preferably five) feet evenly disposed around the longitudinal axis of the bottle and projecting from a hemispherical base form of the bottle to provide a stable self-standing support for the bottle. Between each adjacent pair of feet is a radially extending valley, the valley floor of which is preferably curved in cross-section. The valley floor generally follows the hemispherical base shape and opens to an extended portion of that base shape lying radially outwardly of the feet.

Figure 1:
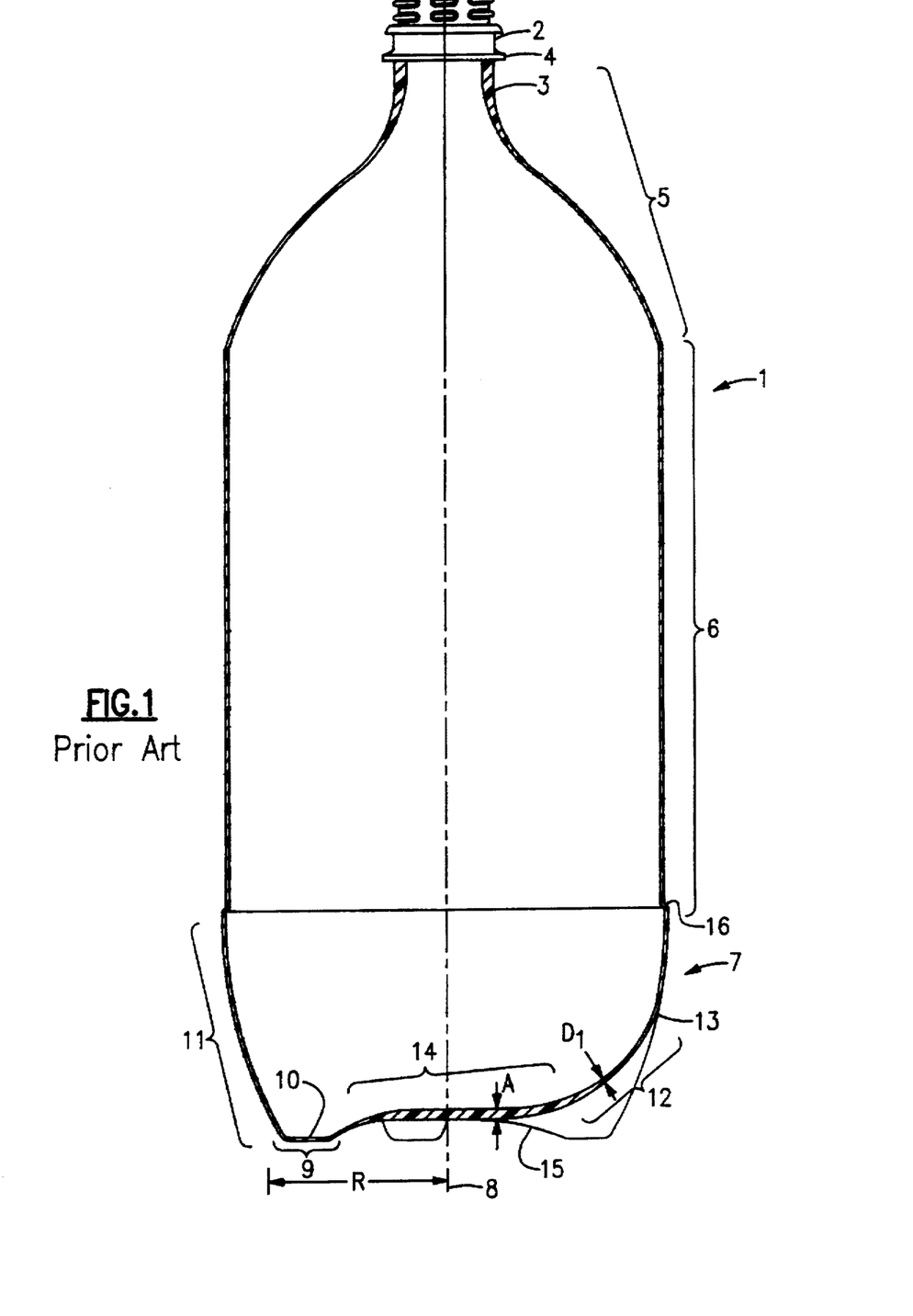
FIG. 1 is a partially sectioned view taken along line 1—1 of FIG. 2 of a prior art bottle having a petaloid base.
Figure 2:
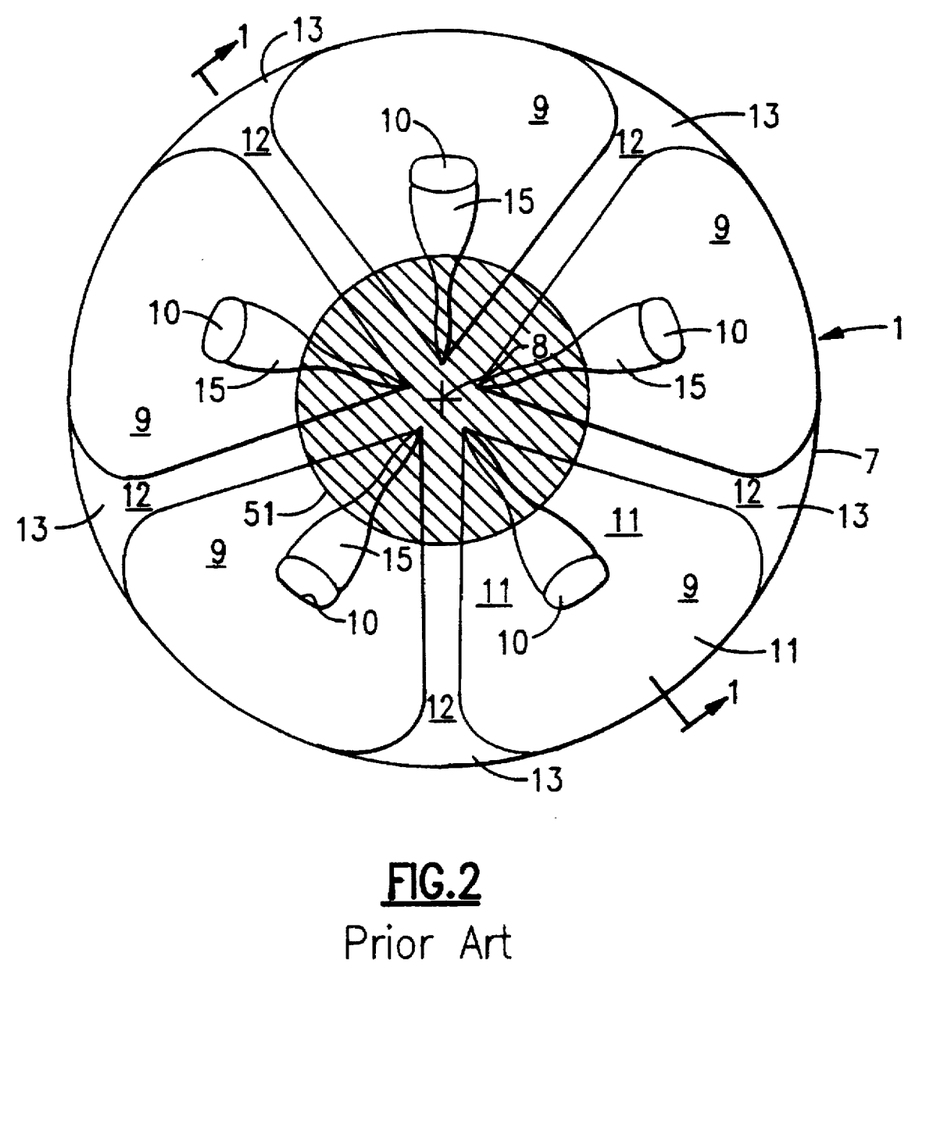
FIG. 2 is a bottom view of the petaloid base of a prior art bottle.

Referring first to FIGS. 1 and 2, a prior art one piece self-standing bi-axially oriented PET two liter bottle 1, of circular horizontal cross-section, comprises a neck finish 2 connected to a neck transition portion 3 by way of a neck support ring 4. The neck transition portion 3 connects by way of an upper portion 5 of the bottle to a substantially cylindrical sidewall portion 6 which terminates at its lower end in a closed base 7, the underlying shape of which is hemispherical. The bottle 1 defines a longitudinal axis 8.

Projecting downwardly from the hemispherical form of the base are five hollow feet 9 which together form a petaloid foot formation with the feet symmetrically and evenly disposed about the longitudinal axis 8 to provide the stable support for the bottle necessary to provide its self-standing ability. The lowest extensions of the feet 9 terminate in bottle support pads 10. Each foot 9 comprises sloping walls 11 extending from its pad 10 to its junction with the underlying hemispherical formation (reference numbers for sloping walls 11 are included in FIG. 2 only with respect to one of the feet although all of the feet are identical).

Radially extending valleys (or straps) 12 are disposed between adjacent pairs of feet 9. These straps 12 each include a valley floor which substantially follows the surface curvature of the underlying hemispherical shape of the base 7 and terminates at and open into an extended portion 13 where the straps 12 meets the sloping wall 11. Although shown in FIG. 2 by solid lines for simplicity at the junctions between the sloping walls 11 and the straps 12 and pads 10, the intersection of these elements are curved in cross-section to provide smooth transitions and structural rigidity of the straps along their length.

The gate area 14 of the base 7, through which extends the axis 8 is connected to each pad 10 by a substantially flat ridge path 15 joined on either side to portions of the sloping walls 11.

The bottle illustrated includes a small annular lip 16 which is primarily present for aesthetic purposes and for label alignment during production. This lip lies adjacent the transition from the sidewall 6 to the base 7.

In the closest known prior art bottle, as illustrated in FIG. 2, the gate area of the base is thickened, as diagrammatically illustrated by shaded circle 51, in an attempt to strengthen the base and prevent rollout and inversion of the base portion. As discussed above, this solution is unsatisfactory because it significantly increases the amount of material required to form the base potion of the bottle, thereby undesirable increasing the weight and cost of the bottle.

It has been discovered, in accordance with the present invention, that rollout can be prevented by providing an annular reinforcing ring located in the transitions between said support pads and said sloping outer walls 11 and in a portion of said sloping outer walls adjacent the transitions and which extends circumferentially around said base portion through said pads, said sloping lateral walls and said straps, while not extending radially inwardly to transitions between the sloping inner walls and the gate area. Such a reinforcing ring is illustrated by shaded area 21 in FIG. 5.

Figure 5:
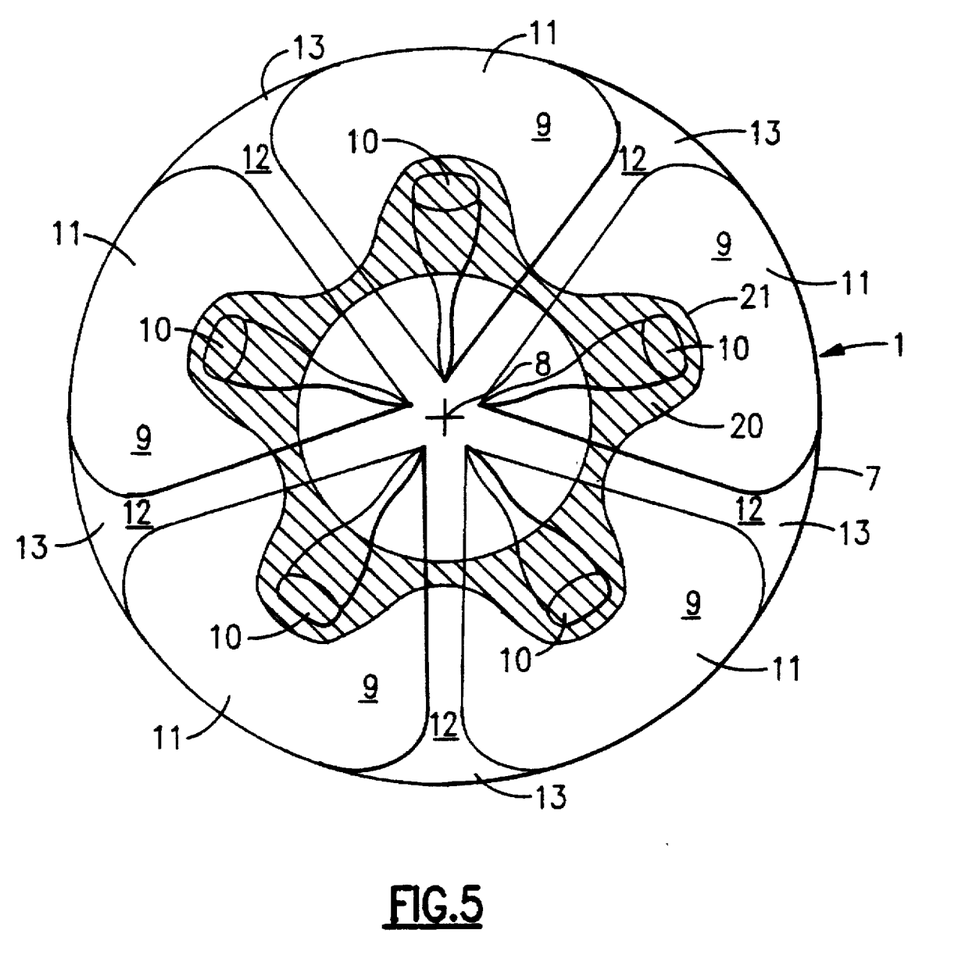
FIG. 5 is a bottom view of the present invention.

Rollout occurs when the internal pressurization of the bottle 7 causes the gate area 14 of the base to creep downwardly, with a circumferentially surrounding area pivoting about an area in or outside of the foot pads 10. By locating the material of the reinforcing ring 21 in the areas in and outside the foot pads 10, the present invention increases the rigidity of these areas. By increasing the rigidity of the areas in and outside the foot pads, the present invention prevents these areas from deforming upon pressurization of the bottle, which prevents the area surrounding the gate area 14 from pivoting, which in turn prevents the gate area 14 from creeping downwardly unacceptably.

Figure 3:
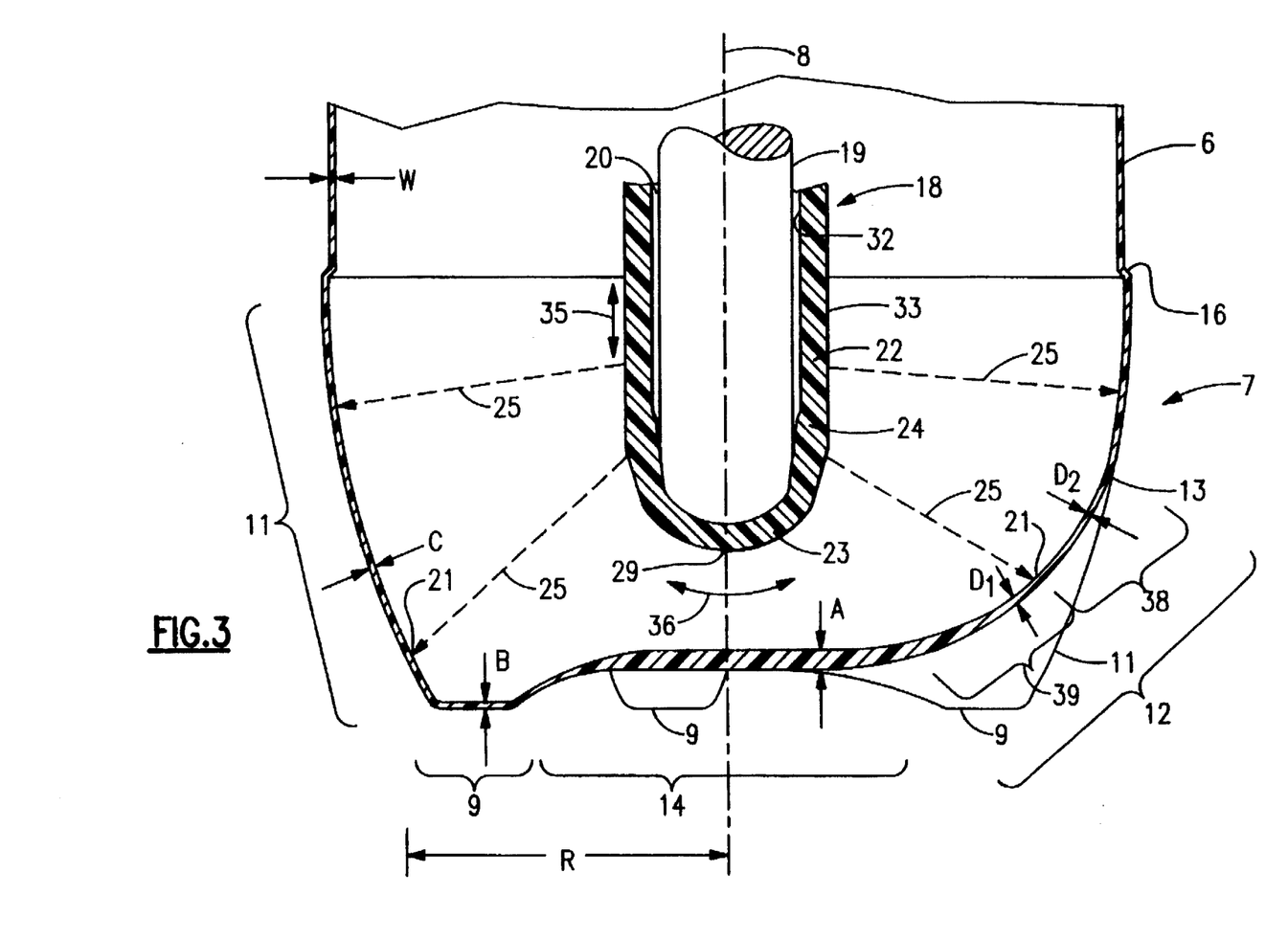
FIG. 3 is a section view of the base of the preform and resulting container of the present invention.

As shown in FIGS. 1 and 3, the transition from the extended portion 13 to the gate 14 is a smooth transition with increasing cross-sectional thickness. That is the thickness at "D1" is less than the thickness at "A". In the present invention, however, the thickness at "D1" is greater than "D1" in the prior art and the thickness at "A" is less than "A" in the prior art.

Figure 4:
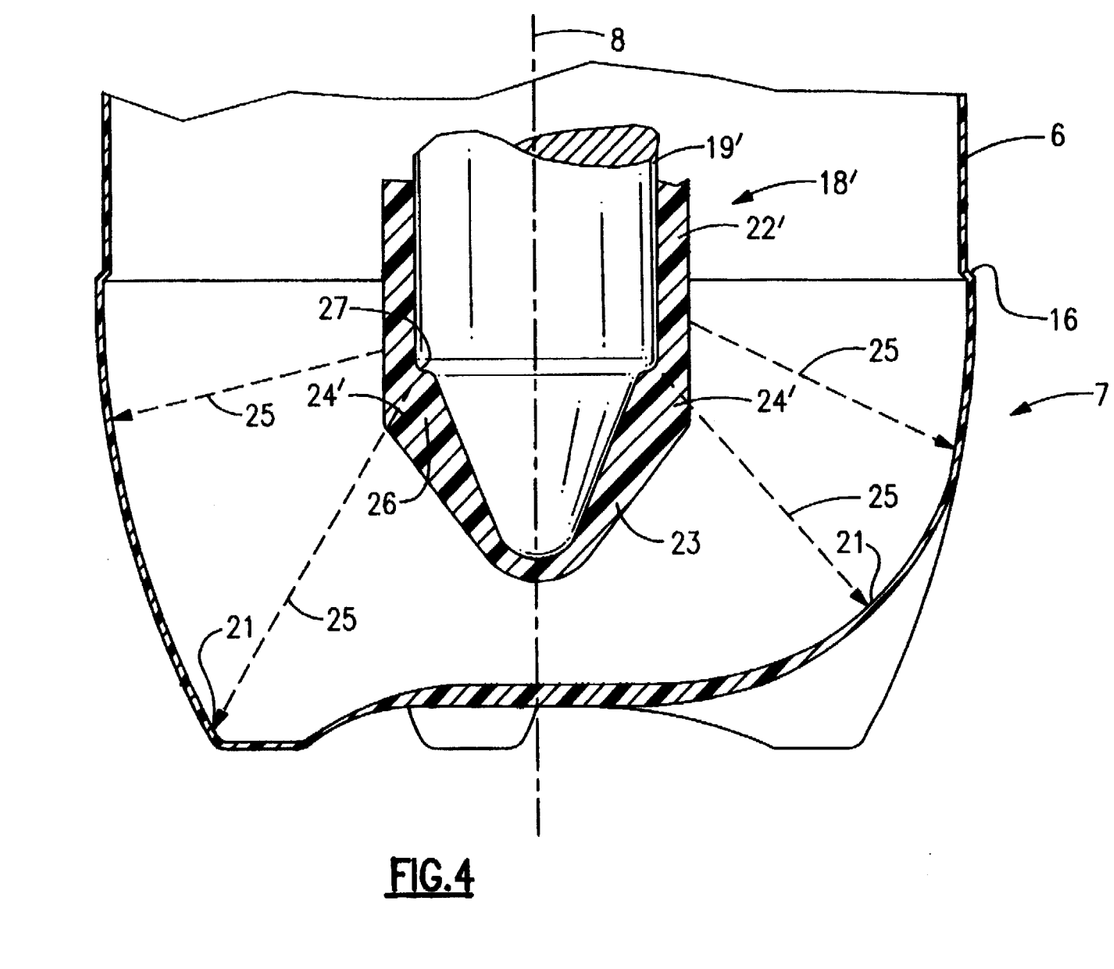
FIG. 4 is a section view of the base of the preform and resulting container of FIG. 3 showing an alternative embodiment of the present invention.

With particular reference to FIGS. 1, 3 and 4 it will be noted that although the bottles are illustrated in cross-sectional form and although the material of the bottles will usually be substantially transparent, details of the interior of the bottles, lying beyond a cross-section taken, are omitted for the sake of clarity in the illustration of the invention.

Turning now to FIG. 3, there is shown the petaloid base of the present invention. For convenience, like elements will be referred to with the same reference numerals as those used in FIGS. 1 and 2. FIG. 3 also shows, in cross-section, part of a monobase preform 18. The preform 18, injection molded polyester, typically PET (polyethylene terephthalate), is temperature conditioned and placed in a blow mold over and longitudinally stretched by a stretch rod 19. Pressurized gas is applied within the annular space 20 between the preform 18 and stretch rod 19 to push the walls of the preform 18 outwardly away from the axis 8 so as to expand the preform 18 into a desired finished shape in the blow mold which defines the exterior of that shape.

The preform comprises a neck finish, connected to a neck transition portion by way of a neck support ring. A sidewall producing portion 22 of the preform extends from the neck transition portion with a substantially constant outside diameter of 1.125 inches (28.575 mm), however, both the inner 32 and outer 33 walls of the sidewall forming portion 22 are slightly tapered to facilitate release from the injection mold cavity and core. The thickness of the sidewall forming portion is about 0.145 inches (3.683 mm). The sidewall forming portion 22 terminates in a closed base producing portion 23 having a wall thickness, in the gate producing area thereof, of 0.115 (2.921 mm) inches. The resulting preform 18 is similar in shape to a test tube. However, the transition (reinforcing ring forming portion 24) between the sidewall forming portion 22 and the bottom forming portion 23 has an increased wall thickness of about 0.155 inches (3.937 mm). The purpose of the reinforcing ring forming portion 24 will be described hereinafter.

Prior to blow molding the preform 18 to produce the bottle 1, the preform 18 is temperature conditioned with preform 18 being turned about axis 8, during conditioning, so as to receive uniform heat. This temperature conditioning takes place outside the blow mold cavity immediately prior to being positioned in the mold cavity. For simplicity, the neck producing portion (which remains substantially the same) and the mold itself are not shown. The stretch rod 19, being extendable along the longitudinal axis, is pushed downward stretching the preform longitudinally until the bottom 29 of the preform 18 is closely adjacent (but spaced from) the bottom of the cavity. The reinforcing ring forming portion 24 has a wall thickness greater than both the wall thickness of the sidewall forming portion 22 and the bottom forming portion 23 and therefor the reinforcing ring forming portion 24 has a greater mass per unit area and is slightly cooler than the thinner portions of the preform. Due to this and the greater thickness more stretching occurs in the sidewall forming portion 22 and the gate area forming portion 23 than in the relatively cool thicker reinforcing ring forming portion 24. During blow molding, the stretch ratio between the wall thickness of the gate area forming portion 23 and the gate area 14 is about 2:1 whereas the stretch ratio between the sidewall forming portion 22 and the sloping wall 11 is about 12:1. In FIG. 3, the extension of the sidewall forming portion 22 by the stretch rod 19 occurs along axis 8 as shown by arrows 35 whereas arrows 36 show the direction of extension in the bottom forming portion 23 by the stretch rod. The inside diameter of the preform 18 is greater than the outside diameter of the stretch rod 19 whereby an annular space 20 is provided. This space 20 facilitates pressurization of the preform 18 to produce the bottle 1. Also, this space provides for a simply designed stretch rod having no step to accommodate the reinforcing ring forming portion 24 of the preform 18.

Pressurized gas is introduced within the preform 18 to blow the preform 18 outwardly and downwardly away from the stretch rod to produce the bottle 1. The gas is introduced so that blow molding proceeds from the top of the bottle 1 adjacent the neck transition to the bottom forming portion 23. The introduction of the gas may commence before the stretch rod has completed the longitudinal extension of the preform.

As is well known by those skilled in the art, preferred performance is obtained in PET containers by providing desired axial and hoop stretching of the material during the blow molding process thus bi-axially orienting the material of the container. The above-described control of the temperature conditioning and the stretch rod operation coupled with the blow molding itself provide desired bi-axial orientation of the container material together with accurate placement of the reinforcing ring forming portion 24 and gate area forming portion 23 to form the reinforcing petaloid base of the container.

Finally, according to the present invention, since the reinforcing ring forming portion 24 is cooler, material is pulled from bottom forming portion during blowing to increase the stretch and thus the orientation in the gate area 14. This is believed at least in part because as the sidewall forming portion 22 is blown outwardly away from the stretch rod 19, the gate area forming portion 23 is also blown outwardly and downwardly away from the stretch rod 19 while the slightly cooler more massive reinforcing ring forming portion 24 is laid into the pad forming portion of the mold last, after the gate area has been formed. Thus, as ring area 24 is more resistant to expansion, the expansion of the reinforcing ring 24 has the tendency to draw material from gate area 23 and area 22 adjacent the reinforcing ring 24. Thus, the gate area forming portion 23 is able to expand across the gate area with greater freedom than is available in the absence of the reinforcing ring forming portion 24.

When the blowing is complete, container in the form of a bottle is produced having less weight than prior art petaloid based bottles while maintaining adequate strength to withstand internal pressure from a carbonated beverage. The base of the bottle comprises all of the features of the prior art bottles to facilitate standing. In addition, the base contains the reinforcing ring 21, which defines the transition between an upper strap 38 and lower strap 39 of strap 12 as well as defines the transition between the sloping walls 11 and feet 9.

The preferred preform design for a typical 2 liter bottle is one having the following:

sidewall forming portion 22 wall thickness=X bottom forming portion 23 wall thickness=Y reinforcing ring forming portion 24 wall thickness=Z Y=from 0.6 X to X with a preferred range 0.7 X to 0.8 X Z=from 1.03 X to 1.33 X with a preferred range from 1.05 X to 1.10 X Prior art preforms blown into large or small contact diameters petaloid bases of 2 litter bottles generally have an outside diameter of the sidewall forming portion 22 of 1.125 inches (28.575 mm). Typically wall thicknesses of the preform in this portion and at the transition to the base forming portion are:

large contact diameter preform=0.155 inches (3.937 mm)

small contact diameter preform=0.145 inches (3.683)

large contact diameter base typically has a contact diameter of 3.2 inches (R=1.6 inches, 40.64 mm)

small contact diameter base typically has a contact diameter of 2.8 inches (R=1.4 inches, 35.56 mm)

Taking the diameter of mid-point of the preform wall thickness (example; 1.125−0.165=0.960) and dividing that number into the base contact diameter provides a stretch ratio for that point as follows.

large contact diameter=3.33=(3.2/(1.125−0.165))

small contact diameter=2.86=(2.8/(1.125−0.145))

With the preform of the present invention, a thickened section 21 of material at the point needed in the bottle base, i.e. the foot is provided by the annular reinforcing ring forming portion 24 which is 0.160 inches (4.064 mm) thick. A typical contact diameter for the bottle of the present invention is about 3.0 inches (R=1.5 inches, 38.1 mm) thus yielding a stretch ratio in the hoop direction for the reinforcing ring of 3.11=3.0/(1.125−0.160)).

The wall reduction in the foot via hoop orientation only is determined by dividing the wall thickness by the stretch ratio which yields;

typical small contact dia 0.145/2.86=0.051 typical large contact dia 0.165/3.33=0.50 bottle bases of the present invention 0.160/3.11=0.052

As seen from the above, the bottle base of the present invention yields the thickest foot wall which gives more reinforcement at the foot as well as minimizing stress whitening which is an aesthetic defect. The stress whitening is caused by overstretching the material and is common to large contact diameter bottles.

The purpose of the reinforcing ring forming portion 24 which forms the reinforcing ring blown into the bottle base provides several benefits. A one piece bottle needs to be self-standing and withstand the pressure from carbonation (which rises as the bottle is exposed temperatures above room temperature). The base will deform unacceptably if reinforcement is not provided in place of simply using more material. Strength is provided from three aspects; 1) geometric reinforcement of the base design, 2) material strength of the PET, 3) orientation strength imparted to the PET.

The preform used in the present invention has a thickened annular ring 24 to form a reinforcing ring 21 placed into those sections of the base which need reinforcement to permit a weight reduction the container base. Further, orientation of the bottom forming portion of the preform is increased to impart orientation strength in the gate area 14 of the bottle. This area is susceptible to stress cracking the risk of which can be reduced by increasing orientation.

The resulting base of the bottle of the present invention typically weighs 13.5 grams which is 1.5 grams less than the typical weight of the small contact diameter base (15 grams) while having a larger contact diameter (3.0 inches (76.2 mm) vs. 2.8 inches (71.12 mm)). The weight of the large contact diameter base is 17.5 grams. Thus significant material weight saving is achieved while contact diameter is increased relative to the prior art small contact diameter base and is 93% of that of the much (4 gram) heavier prior art large contact diameter base.

In a comparison of bottle size, weight and wall thicknesses of prior art small contact diameter and large contact diameter bottles with a bottle of the present invention, the following has been found.

In testing a prior art container having a small diameter base (1.4 inches (35.56 mm) in radius) and the same base weight (13.5 gm) as the present invention, it has been discovered that without the redistribution of the material and the reinforcing ring of the present invention, the container did not have adequate structural strength to withstand the internal pressure generated by the carbonated beverage. Thus, merely reducing weight is insufficient to obtain a structurally sound bottle.

There are a number of significant advantages of the bottle of the present invention to prior art small contact diameter bottles. The first and most important is the reduction in weight of the base (from 15 grams to 13.5 grams) while having a larger base diameter, from 2.8 to 3.0 inches (71.12 mm to 76.2 mm). Second, more material is provided in the foot 9 at "B" typically from 0.010 to 0.012 inches (0.254 mm to 0.305 mm) thick so that there exists less potential for stress whitening, thereby providing a more aesthetically pleasing bottle. This added material also provides a stronger foot. Third, the gate area 14 is thinner, typically from 0.077 inches to 0.063 inches (1.956 mm to 1.6 mm), while maintaining adequate strength. As previously discussed, the thickness 14 can be reduced because greater stretching occurs in bottom forming portion 23 to increase orientation thereby increasing strength coupled with lighter weight. Prior art bottles had less stretching in this area and thus required a greater thickness to maintain adequate strength and reduce stress cracking. Fourth, the amount of stretching during blowing is less at "D1" and more at "D2" and at point "A" and area 14 than in the prior art bottles. The redistribution of the material and the reinforcing ring allow this to occur without sacrificing bottle integrity.

The overall reduction in weight of the base from a prior art large contact diameter base (17.5 grams to 13.5 grams) while maintaining more than 93% of the contact diameter (3.0/3.2) is accomplished by placing the reinforcing ring 21 in areas of the base to provide the most resistance to deformation, i.e. the strap 12 and feet 9, while reducing material thickness and increasing orientation in the gate area 14.

It is preferable for changes in thickness in the preform to be gradual. It will be appreciated that the actual shape of the preform may differ from that illustrated herein providing the concepts set forth are followed.

The degree of stretch during blowing in a given section of the container, and therefore the degree of orientation, can be estimated by measuring the degree of wall thickness reduction during blowing in that section of the container. The greater the degree of wall thickness reduction in a given section of the bottle during blowing, the greater the degree of stretching and orientation of that section.

Table 1 shows a comparison of preform and container thickness, weight and wall reduction ratio (ratio of thickness of a given section of the preform to the thickness of a corresponding section of the container after blowing) of prior art preforms for producing small contact diameter and large contact diameter containers and the present preform for producing the present container. The thickness of the preforms, the thickness of the bottles and the wall thickness reduction ratios are each shown for a) a generally thickest preform and resulting thickest bottle, b) typical preform and resulting typical preform and c) thinnest preform and resulting thinnest container for each of the prior art preforms and the present preform.

outer sloping walls of the prior art containers. Therefore, the present invention provides for thinner sidewall straps and outer sloping walls with greater orientation and strength than the prior art containers, providing further reduction in material usage.

It will be appreciated that stretch rod impact may change thickness in gate area 14.

Table 1 sets forth reduction ratios for average minimum thickness preforms and containers, average typical thickness preforms and containers and average maximum thickness preforms and containers. The actual range of reduction ratios of the present invention extend beyond the ranges set forth in Table 1. Table 2 sets forth the ranges of the reduction ratios according to the present invention, without regard to the illustrative wall thickness measurements of Table. 1.

TABLE 1

| PREFORM WALL THICKNESS (mils) | | | | BOTTLE WALL THICKNESS (mils) | | | | PREFORM/BOTTLE WALL THICKNESS REDUCTION RATIO | | |
|---|---|---|---|---|---|---|---|---|---|---|
| a) (prior art) large contact | | | | a) (prior art) large contact; weight 53 gm (typical); base weight 17.5 gm (typical); contact radius (R) 1.6 inches | | | | a) (prior art) large contact | | |
| | min. | typical | max. | | min. | typical | max. | min/min | typical | max/max |
| body wall | 145 | 155 | 165 | body wall | 10 | 12 | 13 | 14.5 | 12.9 | 12.7 |
| | | | | area C | 8 | 10 | 11 | 18.1 | 15.5 | 15.0 |
| | | | | area D2 | 14 | 17 | 20 | 10.4 | 9.1 | 8.3 |
| area D1 | 145 | 155 | 165 | area D1 | 48 | 55 | 73 | 3.0 | 2.8 | 2.3 |
| | | | | area B | 7 | 8 | 9 | 20.7 | 19.4 | 18.3 |
| gate | 125 | 135 | 145 | point A | 105 | 126 | 133 | 1.2 | 1.1 | 1.1 |
| | | | | gate area | 80 | 88 | 97 | 1.6 | 1.5 | 1.5 |
| b) Monobase | | | | b) Monofoot weight 48 cm (typical) base weight 13.5 (typical) contact radius (R) 1.5 inches | | | | b) Monobase/Monofoot | | |
| body wall (22) | 140 | 145 | 160 | body wall W | 10 | 11 | 12 | 14.0 | 13.2 | 13.3 |
| | | | | area C | 7 | 9 | 10 | 20.0 | 16.1 | 16.0 |
| | | | | area D2 | 11 | 12 | 15 | 12.7 | 12.1 | 10.7 |
| reinforcing ring (24) | 145 | 155 | 165 | area D1 | 45 | 59 | 71 | 3.2 | 2.6 | 2.3 |
| | | | | area B | 10 | 12 | 14 | 14.5 | 12.9 | 11.8 |
| gate (23) | 105 | 115 | 125 | point A | 78 | 82 | 96 | 1.3 | 1.4 | 1.3 |
| | | | | gate area (14) | 55 | 63 | 76 | 1.9 | 1.8 | 1.6 |
| c) (prior art) small contact | | | | c) (prior art) small contact; weight 49 gm (typical); base weight 15 gm (typical); contact radius (R) 1.4 inches | | | | c) (prior art) small contact | | |
| body wall | 140 | 145 | 160 | body wall | 10 | 11 | 12 | 14.0 | 13.2 | 13.3 |
| | | | | area C | 9 | 11 | 12 | 15.6 | 13.2 | 13.3 |
| | | | | area D2 | 11 | 13 | 16 | 12.7 | 11.2 | 10.0 |
| area D1 | 140 | 145 | 160 | area D1 | 38 | 44 | 62 | 3.7 | 3.3 | 2.6 |
| | | | | area B | 9 | 10 | 11 | 15.6 | 14.5 | 14.5 |
| gate | 110 | 120 | 135 | point A | 89 | 105 | 123 | 1.2 | 1.1 | 1.1 |
| | | | | gate area | 69 | 77 | 88 | 1.6 | 1.6 | 1.5 |

As shown in Table 1, the wall thickness reduction ratios of the present invention in the gate area 14 and at point A are greater than the wall thickness reduction ratios in the corresponding areas of the two prior art bottles. Thus, the gate area of the present bottle has a higher degree of orientation and may be made with a thinner wall thickness than the gate areas of prior art bottles. Thus a savings in material in the gate area 14, over prior art containers is realized by the present invention. The wall thickness D2 of the straps 12 and the wall thickness C, of the sloping outer walls of the present container are thinner than the prior art container. Furthermore, due to the reinforcing ring, the wall thickness reduction ratio of the straps (point D2) and of the sloping outer walls (point C) of the present container are also greater than the wall thickness reduction ratios of the straps and

TABLE 2

| Monofoot Wall Thickness Reduction Ratio | | | |
|---|---|---|---|
| | | Min | Max |
| Body Wall (22) | Body Wall W | 11.7 | 16.0 |
| | Area C | 14.0 | 22.9 |
| | Area D2 | 9.3 | 14.5 |
| Reinforcing Ring (24) | Area D1 | 2.0 | 3.7 |
| | Area B | 10.3 | 16.5 |
| Gate (23) | Point A | 1.1 | 1.6 |
| | Gate area (14) | 1.4 | 2.3 |

In an alternative embodiment (FIG. 4), a monobase preform 18' having an annular hub 26 is engaged by a mating annular groove 27 in the end of the stretch rod 19'. This preform is of the type disclosed in the inventor's own patents (U.S. Pat. Nos. 4,780,257; 4,889,752; and 4,927,679), which may be used in the present invention to provide a bottle with a petaloid base rather than a champagne base to which those patents relate. The resulting bottle will contain the reinforcing ring 21, produced by the reinforcing ring forming portion 24' and bottom forming portion 23' of the preform 18'.

Turning now to FIG. 5, there is shown the bottom view of the base of the present invention showing the reinforcing ring 21 extending circumferentially around the base and following the curves and slopes through the straps 12 and sloping walls 11.

Figure 6:
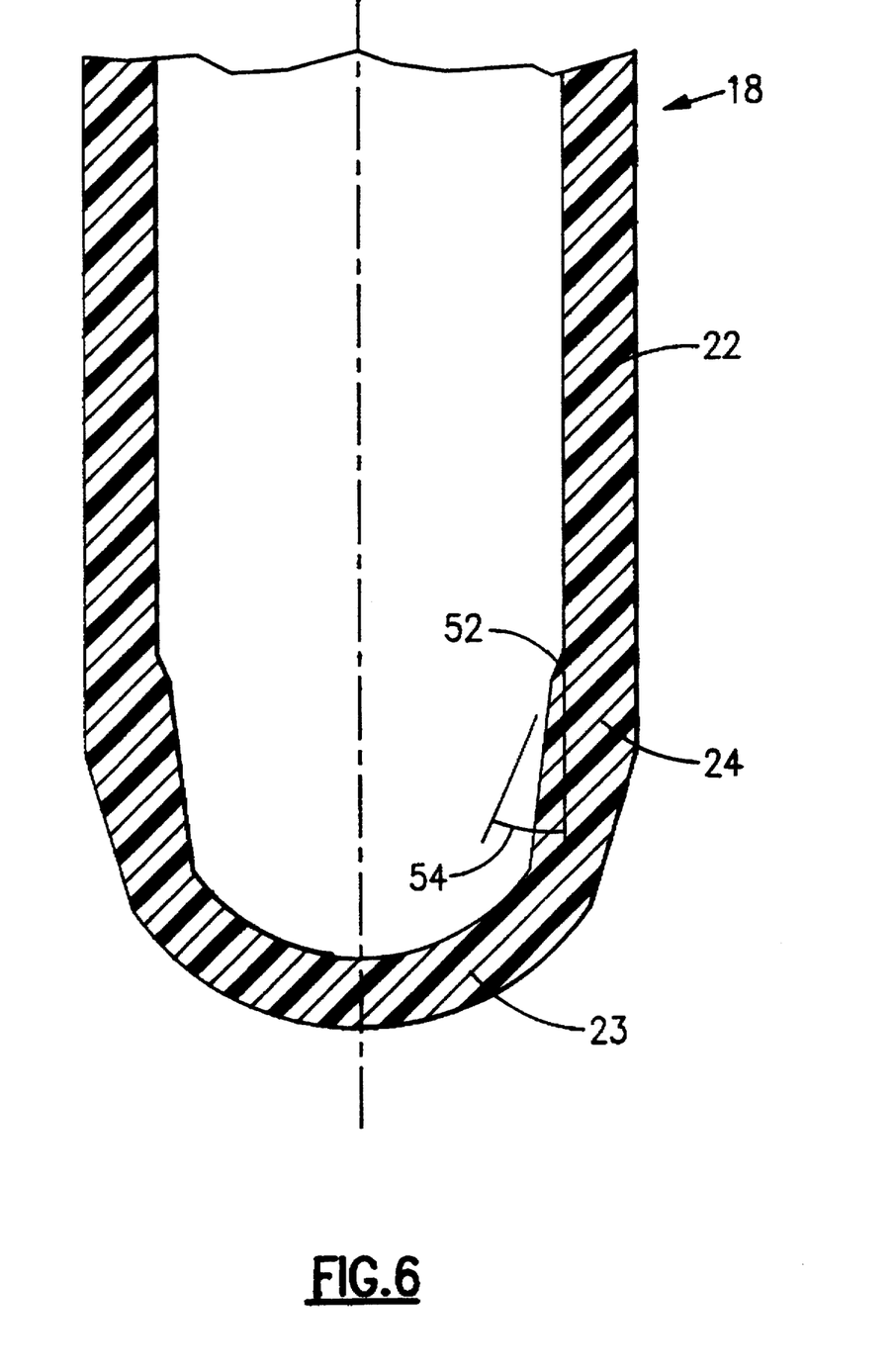
FIG. 6 is a section view of the base of the preform of FIG. 3 showing the transition from the sidewall forming portion to the reinforcing ring forming portion.

FIG. 6 is an enlarged cross section of the preform 18 of FIG. 3, showing the sloped transition 52 from the sidewall forming portion 22 to the reinforcing ring forming portion 24. The transition 52 is a conic section that intersects the sidewall forming portion 22 at an angle 54 of about 3° to about 25°, more preferably of about 6° to about 7°. The sloped transition 52 eliminates stress whitening in the container that may occur when a sudden transition is provided between the sidewall forming portion 22 and the reinforcing ring forming portion 21.

What is claimed is:

1. A blow molding process for producing a self-standing one-piece polyester container for carbonated beverages defining a longitudinal axis and comprising a sidewall portion which is integral with and terminates in a closed base portion of a petaloid form defining at least three feet disposed about the longitudinal axis whereby the container is self standing, each said foot being defined by: i) a support pad; ii) a sloping outer wall extending generally upwardly from a radially outward extremity of the support pad to the sidewall portion; iii) sloping lateral walls extending generally upwardly from radially extending extremities of the support pad to radially extending straps disposed between adjacent pairs of feet, each said strap extending from a gate area, centered on said longitudinal axis, along a curve to said sidewall portion; iv) a sloping inner wall extending from a radially inner extremity of the support pad to the gate area; and, v) a reinforcing ring located on said curve between said gate area and said sidewall portion, in a transition between said support pad and said sloping outer wall and in at least a portion of said sloping outer wall adjacent this transition, and extending circumferentially around said base portion through said pads, said lateral sloping walls and said straps, the method comprising the steps of:

a) forming a hollow preform comprising a sidewall forming portion of constant wall thickness material along the length of the sidewall forming portion, for forming a constant thickness sidewall portion of the container, and terminating, in a closed base forming portion, a reinforcing ring forming portion being located at a transition between the sidewall forming portion and the base forming portion, said reinforcing ring forming portion having a wall thickness greater than the wall thickness in the sidewall forming portion and greater than a wall thickness in the base forming portion, the wall thickness in the base forming portion being equal to or less than the wall thickness in the sidewall forming portion;

b) temperature conditioning the preform;

c) positioning the preform in a blow mold cavity defining the finished container shape and having a neck finish engaging top and a base forming bottom;

d) inserting a stretch rod into the preform;

e) extending the stretch rod within the cavity to move the bottom of the preform toward the bottom of the blow mold cavity to longitudinally stretch the material in at least the sidewall forming portion such that the preform extends from the top to adjacent the bottom of the blow mold cavity; and, f) injecting pressurized gas into the preform whereby the preform is radially stretched outwardly to fill the blow mold cavity to form the container with the material of the reinforcing ring located in the transitions between said support pads and said sloping outer walls and in at least a portion of said sloping outer walls adjacent these transitions, extending circumferentially around said base portion through said pads, said sloping lateral walls and said straps, and not extending radially inwardly to transitions between the sloping inner walls and the gate area, and the gate area and the transitions between the sloping inner walls and the gate area both having wall thicknesses that are less than the wall thicknesses in corresponding portions of the preform.

2. The method according to claim 1 wherein the step of forming the preform comprises the step of providing the base forming portion with a wall thickness in the range from about 0.105 inches (2.667 mm) to about 0.125 inches (3.175 mm) and the reinforcing ring forming portion with a wall thickness in the range from about 0.145 inches (3.683 mm) to about 0.165 inches (4.191 mm).

3. The method according to claim 1 wherein the step of forming the preform comprises the step of forming a sloping transition from the sidewall forming portion to the reinforcing ring forming portion, such that the transition intersects the sidewall forming portion at an angle of about 3° to about 25°.

4. The method according to claim 3 wherein the step of forming the preform comprises the step of forming a sloping transition from the sidewall forming portion to the reinforcing ring forming portion, such that the transition intersects the sidewall forming portion at an angle of about 6° to about 7°.

5. The method according to claim 1 wherein the step of injecting pressurized gas into the preform comprises stretching the base forming portion of the preform, whereby the gate area has a wall thickness in a range from about 0.055 inches (1.397 mm) to about 0.076 inches (1.930 mm) and each said support pad has a wall thickness in a range from about 0.010 inches (0.254 mm) to about 0.014 inches (0.356 mm).

6. The method according to claim 1, wherein the step of injecting pressurized gas into the preform comprises stretching the base forming portion of the preform, whereby each said support pad has a wall thickness in a range from about 0.010 inches (0.254 mm) to about 0.014 inches (0.356 mm) and each said sloping outer wall has a thickness in a range from about 0.007 inches (0.178 mm) to about 0.010 inches (0.254 mm).

7. The method according to claim 6, wherein the step of injecting pressurized gas into the preform comprises stretching the base forming portion of the preform, whereby the gate area has a wall thickness in a range from about 0.055 inches (1.397 mm) to about 0.076 inches (1.93 mm).

8. The method according to claim 1, wherein the step of injecting pressurized gas into the preform comprises stretching the base forming portion, the reinforcing ring forming portion and the sidewall forming portion of the preform, whereby said gate area has a wall thickness a range from about 0.055 inches (1.397 mm) to about 0.076 inches (1.930 mm), said foot support pad has a wall thickness in a range from about 0.010 inches (0.254 mm) to about 0.014 inches (0.356 mm), each said sloping outer wall has a wall thickness in a range from about 0.007 inches (0.178 mm) to about 0.010 inches (0.254 mm), transitions between said gate area and each said strap have a wall thickness in a range from about 0.045 inches (1.143 mm) to about 0.071 inches (1.803 mm), and a location in said gate area located adjacent said longitudinal axis has a wall thickness in a range from about 0.078 inches (1.981 mm) to about 0.096 inches (2.438 mm).

9. The method according to claim 1, wherein during blowing a reduction in thickness in a base forming portion of the preform to the gate area of the container has a ratio in a range from about 1.4 to about 2.3 and a reduction in thickness in a base forming portion of the preform to the support pads has a ratio in a range from about 10.3 to about 16.5.

10. The method according to claim 1, wherein during blowing a reduction in thickness in a base forming portion of the preform to the support pads has a ratio in a range from about 10.3 to about 16.5 and a reduction in thickness in a base forming portion of the preform to the sloping outer walls has a ratio in a range from about 14.0 to about 22.9.

11. The method according to claim 10, wherein a reduction in thickness during blowing in a base forming portion of the preform to the gate area of the container has a ratio in a range from about 1.4 to about 2.3.

12. The method according to claim 11, wherein a reduction in thickness during blowing in a base forming portion of the preform to a location on the container in the gate area adjacent the longitudinal axis has a ratio in a range from about 1.1 to about 1.6.

13. The method according to claim 11, wherein a reduction in thickness during blowing in a base forming portion of the preform to radially outer portions of the straps has a ratio in a range from about 9.3 to about 14.5.

14. The method according to claim 11, wherein a reduction in thickness during blowing in a base forming portion of the preform to radially inner portions of the straps has a ratio in a range from about 2 to about 3.7.

15. The method according to claim 1, wherein during blowing a reduction in thickness in a base forming portion of the preform to the gate area of the container has a ratio in a range from about 1.6 to about 1.9 and a reduction in thickness in a base forming portion of the preform to the support pads has a ratio in a range from about 11.8 to about 14.5.

16. The method according to claim 1, wherein during blowing a reduction in thickness in a base forming portion of the preform to the support pads has a ratio in a range from about 11.8 to about 14.5 and a reduction in thickness in a base forming portion of the preform to the sloping outer walls has a ratio in a range from about 16.0 to about 20.

17. The method according to claim 16, wherein a reduction in thickness during blowing in a base forming portion of the preform to the gate area of the container has a ratio in a range from about 1.6 to about 1.9.

18. The method according to claim 1 wherein the step of injecting pressurized gas into the preform comprises stretching the preform, whereby expansion of the reinforcing ring forming portion draws material from the gate area forming portion and the sidewall forming portion adjacent the reinforcing ring, thereby stretching and thinning the gate area and the sloping outer walls.

* * * * *